(12) United States Patent
Okabe

(10) Patent No.: US 8,101,314 B2
(45) Date of Patent: Jan. 24, 2012

(54) SEPARATOR AND FUEL CELL

(75) Inventor: Hiroki Okabe, Mishima (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 635 days.

(21) Appl. No.: 12/282,560

(22) PCT Filed: Feb. 27, 2007

(86) PCT No.: PCT/IB2007/000475
§ 371 (c)(1),
(2), (4) Date: Sep. 11, 2008

(87) PCT Pub. No.: WO2007/105046
PCT Pub. Date: Sep. 20, 2007

(65) Prior Publication Data
US 2009/0053581 A1 Feb. 26, 2009

(30) Foreign Application Priority Data

Mar. 13, 2006 (JP) .................................. 2006-067565

(51) Int. Cl.
*H01M 2/38* (2006.01)
*H01M 2/40* (2006.01)
*H01M 8/24* (2006.01)
*H01M 2/20* (2006.01)

(52) U.S. Cl. ......... 429/457; 429/458; 429/468; 429/469

(58) Field of Classification Search .................. 429/457, 429/458, 468, 469
See application file for complete search history.

(56) References Cited

U.S. PATENT DOCUMENTS

| 4,678,724 A | 7/1987 | McElroy |
| 5,532,073 A * | 7/1996 | Hirata et al. .................. 429/460 |
| 6,316,137 B1 | 11/2001 | Kralick |
| 2003/0113608 A1 | 6/2003 | Hong et al. |
| 2006/0040159 A1 | 2/2006 | Sato et al. |
| 2006/0110651 A1 | 5/2006 | Wakahoi et al. |
| 2007/0178362 A1 * | 8/2007 | Miyazaki ........................ 429/38 |

FOREIGN PATENT DOCUMENTS

| DE | W 100 06 699 | 8/2001 |
| JP | 2003-77499 | 3/2003 |
| JP | 2004-6104 | 1/2004 |
| WO | WO 2006/062242 A1 | 6/2006 |

OTHER PUBLICATIONS

Notification of the First Office Action for Chinese Appl. No. 200780008698.X dated Feb. 12, 2010.
Office Action for German Appl. No. 11 2007 000 540.8-45 dated Jun. 10, 2010.

* cited by examiner

*Primary Examiner* — Patrick Ryan
*Assistant Examiner* — Julian Anthony
(74) *Attorney, Agent, or Firm* — Finnegan, Henderson, Farabow, Garrett & Dunner, LLP

(57) ABSTRACT

A separator (41) for use in a fuel cell stack has an anode facing plate (44), a cathode facing plate (42), and an intermediate plate (45). The intermediate plate (45) has an air supply through-hole (452*a*), an air discharge through-hole (452*b*), a hydrogen supply through-hole (454*a*), and a hydrogen discharge through-hole (454*b*). The intermediate plate (45) also has through-holes (452*c*1, 452*d*1, 452*e*1, and 452*f*1). The air supply through-hole (452*a*) is in communication with the through-hole (452*c*1), the air discharge through-hole (452*b*) with the through-hole (452*d*1), the hydrogen supply through-hole (454*a*) with the through-hole (452*e*1), and the hydrogen discharge through-hole (454*b*) with the through-hole (452*f*1), respectively via communication passages (452*c*2, 452*d*2, 452*e*2, and 452*f*2) formed in the intermediate plate (45).

5 Claims, 8 Drawing Sheets

CATHODE FACING PLATE

ANODE FACING PLATE

INTERMEDIATE PLATE

COOLANT PASSAGE FORMING MEMBER

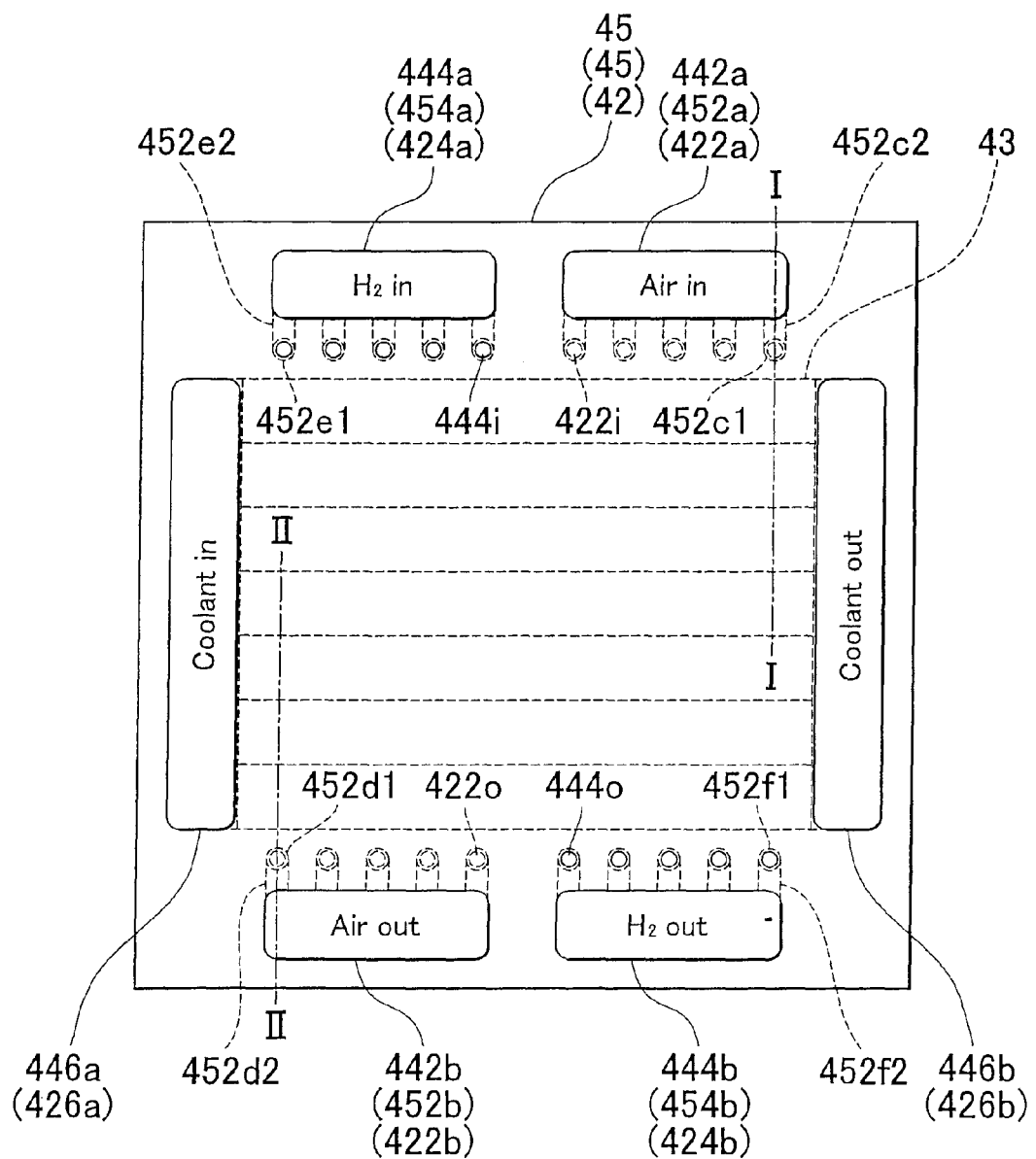

I-I SECTION

II-II SECTION

CATHODE FACING PLATE

ANODE FACING PLATE

INTERMEDIATE PLATE

COOLANT PASSAGE FORMING MEMBER

I–I SECTION

II–II SECTION

SEPARATOR AND FUEL CELL

CROSS-REFERENCE TO RELATED APPLICATIONS

This application is a national phase application of International Application No. PCT/IB2007/000475, filed Feb. 27, 2007, and claims the priority of Japanese Application No. 2006-067565, filed Mar. 13, 2006, the contents of both of which are incorporated herein by reference.

BACKGROUND OF THE INVENTION

1. Field of the Invention

The present invention relates to a separator and a fuel cell having the separator.

2. Description of the Related Art

Fuel cells, which generate electricity through an electrochemical reaction between hydrogen and oxygen, are attracting attention as energy sources. A fuel cell has a stack structure in which membrane-electrode assemblies, each having an anode (hydrogen electrode) and a cathode (oxygen electrode) on both sides of an electrolyte membrane that has proton conductivity, and separators are stacked alternately (the fuel cell having such a stack structure is hereinafter referred to also as "fuel cell stack").

JP-A 2004-6104 describes a separator having a fuel gas plate that faces an anode (hereinafter referred to as "anode facing plate"), an oxidant gas plate that faces a cathode (hereinafter referred to as "cathode facing plate"), and an intermediate plate disposed between these plates. In the separator, each gas plate has a through-hole and a gas communication hole, and the intermediate plate has a delivery passage for delivery of a fuel gas or an oxidant gas from the gas communication hole to the through-hole of each gas plate.

A load is applied to the fuel cell stack in the stacking direction of the stack structure, to prevent deterioration in cell performance due to an increase in contact resistance at any point in the stack structure and to prevent gas leakage.

In the separator described in JP-A-2004-6104, however, the delivery passage passes through the intermediate plate in the thickness direction, and thus the rigidity against the loads applied vertically with respect to the surface of the separator, that is, in the stacking direction of the stack structure, is relatively low at a portion of the intermediate plate where the gas delivery passage is formed.

SUMMARY OF THE INVENTION

The present invention increases the rigidity against the loads applied vertically to the surface of a separator that is used in a fuel cell stack having an anode facing plate, a cathode facing plate, and an intermediate plate.

A first aspect of the invention provides a separator for use in a fuel cell having a stack structure in which a plurality of membrane-electrode assemblies are stacked with the separators interposed therebetween. Each membrane-electrode assembly has an electrolyte membrane and electrodes disposed on both sides of the electrolyte membrane. The separator includes: two electrode facing plates that face the respective electrodes of the membrane-electrode assembly and an intermediate plate interposed between the two electrode facing plates. The two electrode facing plates and the intermediate plate each have a first through-hole that allows a reaction gas to be supplied to the membrane-electrode assembly, or a discharge gas discharged from the membrane-electrode assembly, to flow in the stacking direction of the stack structure. The first through-holes of the two electrode facing plates and the intermediate plate overlap with each other when viewed in the stacking direction. One of the two electrode facing plates and the intermediate plate each have a second through-hole that allows at least the reaction gas to be supplied, or the discharge gas to be discharged, vertically with respect to the membrane-electrode assembly. The second through-holes of the one of the two electrolyte facing plates and the intermediate plate overlap with each other as viewed in the stacking direction. The intermediate plate has a communication passage that allows communication between the first through-hole and the second through-hole in the intermediate plate. The dimension of the communication passage in the thickness direction of the intermediate plate is smaller than the thickness of the intermediate plate.

In the first aspect of the invention, the intermediate plate has a second through-hole and a communication passage, in place of the gas delivery passage in the intermediate plate of the separator described in JP-A-2004-6104 mentioned above. The dimension of the communication passage in the thickness direction of the intermediate plate is smaller than the thickness of the intermediate plate, and the communication passage does not pass through the intermediate plate in the thickness direction. Thus, the rigidity against loads applied vertically to the surface of the separator can be increased, compared to the case where a gas delivery passage passes through the intermediate plate in the thickness direction.

The communication passage may be a through-hole that passes through the inside of the intermediate plate in the direction perpendicular to the stacking direction of the stack structure.

In this way, the diameter of the communication passage can be made largest without the communication passage passing through the intermediate plate in the thickness direction.

In the separator described above, the two electrode facing plates and the intermediate plate may be bonded together using a bonding agent.

In the separator of JP-A-2004-6104 described above, in which the intermediate plate has a gas delivery passage that passes through the intermediate plate in the thickness direction, if an anode facing plate, a cathode facing plate, and an intermediate plate are bonded together using a bonding agent such as a brazing material or an adhesive, the bonding agent is squeezed into the gas delivery passage. This reduces the cross-sectional area of the gas delivery passage and a desired gas flow rate cannot be achieved. In the first aspect of the invention, however, a gas delivery passage does not pass through the intermediate plate in the thickness direction; thus, the bonding agent is not squeezed into the gas delivery passage. As a result, the cross-sectional area of the communication passage is not reduced and a desired gas flow rate can be achieved.

In the separator described above, the intermediate plate may be made of resin, and the bonding agent may be an adhesive.

In the first aspect of the invention, the intermediate plate is made of resin. Thus, the weight of the separator can be reduced, compared to the case where the intermediate plate is made of metal. Another advantage to using a resin member is that a resin member is easier to process than a metal member.

Alternatively, the two electrode facing plates and the intermediate plate may be made of metal, and the bonding agent may be a brazing material.

In this way, the strength of the fuel cell can be improved, compared to the case where the intermediate plate is made of resin and the bonding agent is an adhesive.

In addition to the constitution as a separator described above, the present invention can be implemented as a fuel cell stack having the separator.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 3 is a plane view of the separator 41;

DETAILED DESCRIPTION OF THE PREFERRED EMBODIMENTS

Figure 1:
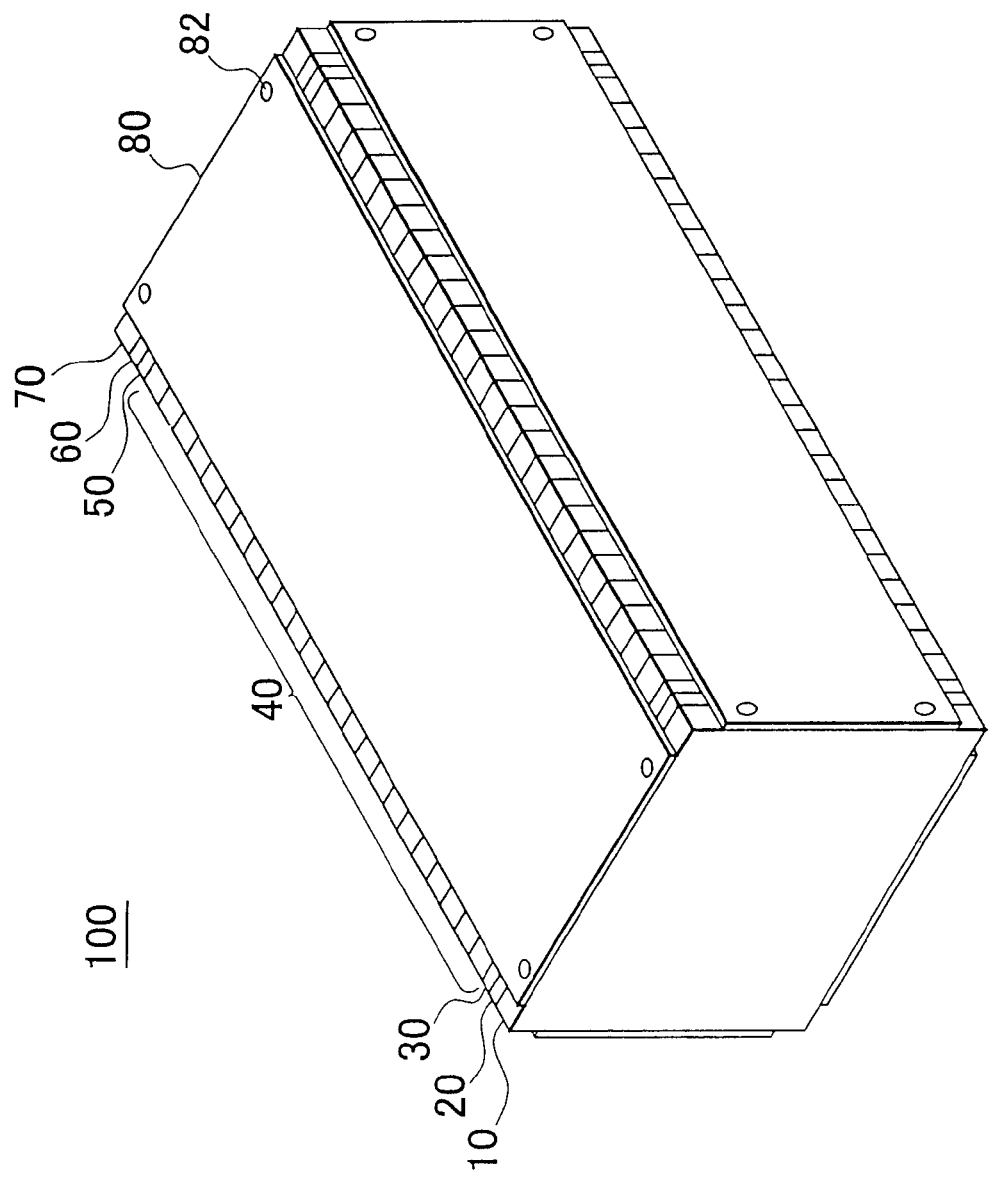
FIG. 1 is a perspective view illustrating the general construction of a fuel cell stack 100 according to an embodiment of the present invention.

FIG. 1 is a perspective view illustrating the general construction of a fuel cell stack 100 in an embodiment of the present invention. The fuel cell stack 100 has a stack structure in which a plurality of cells for generating electricity through an electrochemical reaction between hydrogen and oxygen are stacked together with separators interposed therebetween. Each cell has an anode, a cathode, and an electrolyte membrane having proton conductivity interposed therebetween as described later. In this embodiment, polymer electrolyte membranes are used as the electrolyte membranes. Instead of the polymer electrolyte membranes, other electrolytes such as a solid oxide and the like may be used. Also, in this embodiment, the separator has a three-layer structure, as described later, and is formed with a passage for hydrogen as a fuel gas to be supplied to the anode, a passage for air as an oxidant gas to be supplied to the cathode, and a passage for coolant. A suitable number of cells may be stacked according to the output power required of the fuel cell stack 100 for a given application.

In the fuel cell stack 100, an end plate 10, an insulating plate 20, a current collecting plate 30, a plurality of fuel cell modules 40, a current collecting plate 50, an insulating plate 60, and an end plate 70 are stacked in this order from one end to the other. These members have supply ports, discharge ports and passages (all not shown) that allow hydrogen as a fuel gas, air as an oxidant gas, and coolant to flow through the fuel cell stack 100. The hydrogen is supplied from a hydrogen tank (not shown). The air and the coolant are pressurized and supplied by pumps (not shown). Each fuel cell module 40 is constituted of a separator 41 and a MEGA seal gasket 46 in which a membrane-electrode assembly and a gasket are integrated, which are described later. The fuel cell module 40 is described later. The term "MEGA" as used herein is an abbreviation for "Membrane Electrode Gas diffusion layer Assembly", and refers to a membrane-electrode assembly that is an electrolyte membrane with a catalyst layer and a gas diffusion layer formed on both surfaces.

The fuel cell stack 100 also has tension plates 80 as shown in the drawing. A pressing force is applied to the fuel cell stack 100 in the stacking direction of the stack structure, to prevent deterioration in cell performance due to an increase in contact resistance at any point in the stack structure, and to prevent gas leakage. By fixing the tension plates 80 to the end plates 10 and 70 at both ends of the fuel cell stack 100 with bolts 82, each fuel cell module 40 is tightened with a predetermined tightening force in the stacking direction.

The end plates 10 and 70, and the tension plates 80 are made of a metal such as steel to ensure rigidity. The insulating plates 20 and 60 are made of an insulating material such as rubber or resin. The current collecting plates 30 and 50 are made of a gas-impermeable conductive material such as densified carbon or copper. Each of the current collecting plates 30 and 50 has an output terminal (not shown) so that the electric power generated in the fuel cell stack 100 can be output therefrom.

As described before, each fuel cell module 40 has a separator 41 and a MEGA seal gasket 46. The separator 41 and the MEGA seal gasket 46 are described below.

FIGS. 2A to 2D are plane views of components of the separator 41. As shown in the drawings, the separator 41 is constituted of a cathode facing plate 42, an anode facing plate 44, an intermediate plate 45, and a coolant passage forming member 43.

In this embodiment, the cathode facing plate 42 and the anode facing plate 44 are flat and have the same square outer shape. These flat plates are made of stainless steel. The coolant passage forming member 43 is also made of stainless steel. The cathode facing plate 42, the anode facing plate 44 and the coolant passage forming member 43 may be made of other metals such as titanium or aluminum instead of stainless steel. Because these members are exposed to the coolant as described later, anti-corrosive metals may also be used.

The intermediate plate 45 has the same outer shape as the cathode facing plate 42 and the anode facing plate 44. The intermediate plate 45 is made of resin. Suitable resins that may be used to make the intermediate plate include, but are not limited to, polypropylene, polyethylene, polyamide, polyurethane and polyethylene terephthalate may be used. Because the separator 41 is required to have a low electrical resistance, conductive resin may be used for the intermediate plate 45.

Figure 2A:
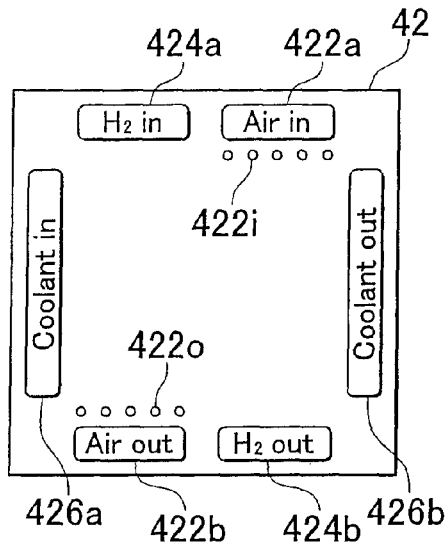
FIGS. 2A, 2B, 2C and 2D are plane views of components of a separator 41.

FIG. 2A is a plane view of the cathode facing plate 42, which contacts the cathode side surface of the MEGA seal gasket 46 to be described later. As shown in the drawing, the cathode facing plate 42 has an air supply through-hole 422$a$, a plurality of air supply ports 422$i$, a plurality of air discharge ports 422$o$, an air discharge through-hole 422$b$, a hydrogen supply through-hole 424$a$, a hydrogen discharge through-hole 424$b$, a coolant supply through-hole 426$a$, and a coolant discharge through-hole 426$b$. In this embodiment, the air supply through-hole 422$a$, the air discharge through-hole 422$b$, the hydrogen supply through-hole 424$a$, the hydrogen discharge through-hole 424$b$, the coolant supply through-hole 426$a$, and the coolant discharge through-hole 426$b$ are generally rectangular, and the air supply ports 422$i$ and the air discharge ports 422$o$ are circular and have the same diameter.

Figure 2B:
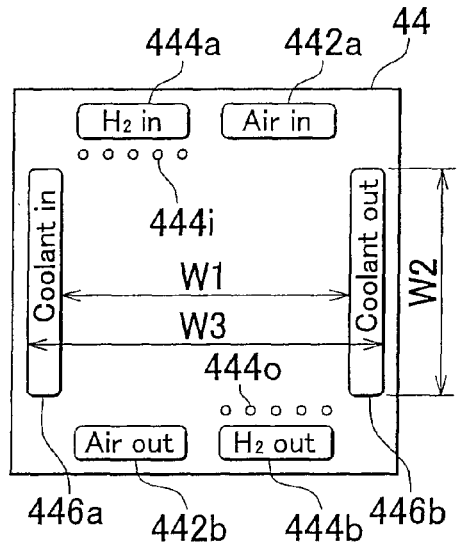

FIG. 2B is a plane view of the anode facing plate 44, which contacts the anode side surface of the MEGA seal gasket 46, to be described later. As shown in the drawing, the anode facing plate 44 has an air supply through-hole 442$a$, an air discharge through-hole 442$b$, a hydrogen supply through-hole 444$a$, a plurality of hydrogen supply ports 444$i$, a plurality of hydrogen discharge ports 444o, a hydrogen discharge through-hole 444b, a coolant supply through-hole 446a, and a coolant discharge through-hole 446b. In this embodiment, the air supply through-hole 442a, the air discharge through-hole 442b, the hydrogen supply through-hole 444a, the hydrogen discharge through-hole 444b, the coolant supply through-hole 446a, and the coolant discharge through-hole 446b are generally rectangular, and the hydrogen supply ports 444i and the hydrogen discharge ports 444o are circular and have the same diameter.

Figure 2C:
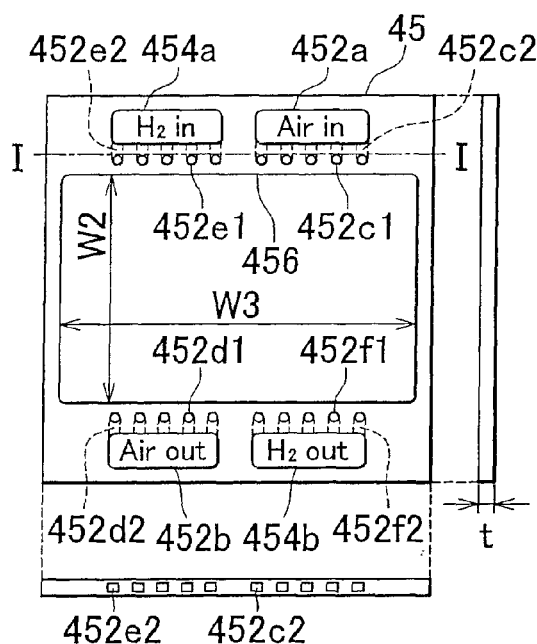

FIG. 2C is an explanatory view of the intermediate plate 45. The drawing shows a plane view, a side view, and a cross-sectional view taken along the line I-I of FIG. 2C, of the intermediate plate 45. The structure of the intermediate plate 45 is the characteristic of the present invention, and described in detail later in contrast to a comparative example.

As shown in the drawing, the intermediate plate 45 has an air supply through-hole 452a, an air discharge through-hole 452b, a hydrogen supply through-hole 454a, and a hydrogen discharge through-hole 454b. In addition, the intermediate plate 45 has a plurality of through-holes 452c1, a plurality of through-holes 452d1, a plurality of through-holes 452e1, and a plurality of through-holes 452f1 in the vicinity of the air supply through-hole 452a, the air discharge through-hole 452b, the hydrogen supply through-hole 454a, and the hydrogen discharge through-hole 454b, respectively. These through-holes are circular and have the same diameter.

The plurality of through-holes 452c1 are in communication with the air supply through-hole 452a via a plurality of communication passages 452c2 formed inside the intermediate plate 45, respectively. The plurality of through-holes 452d1 are in communication with the air discharge through-hole 452b via a plurality of communication passages 452d2 formed inside the intermediate plate 45, respectively. The plurality of through-holes 452e1 are in communication with the hydrogen supply through-hole 454a via a plurality of communication passages 452e2 formed inside the intermediate plate 45, respectively. The plurality of through-holes 452f1 are in communication with the hydrogen discharge through-hole 454b via a plurality of communication passages 452f2 formed inside the intermediate plate 45, respectively.

The intermediate plate 45 also has a coolant flowing part 456 that allows the coolant to flow through the intermediate plate 45 in the separator 41. The transverse length of the coolant flowing part 456 in the drawing is the same as the length W3 from the outer side of the coolant supply through-hole 446a to the outer side of the coolant discharge through-hole 446b shown in FIG. 2B, and the vertical length is the same as the length W2, or the vertical length of the coolant supply through-hole 446a and the coolant discharge through-hole 446b shown in FIG. 2B.

Figure 2D:
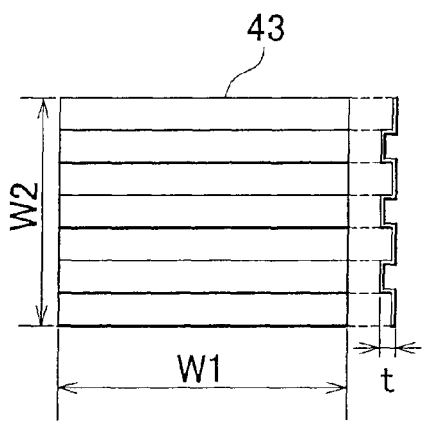

FIG. 2D shows a plane view and a side view of the coolant passage forming member 43. A plane view and a side view of the coolant passage forming member 43 are shown on the left side and the right side, respectively, of FIG. 2D.

As shown in the drawing, the coolant passage forming member 43 has rectangular projections and depressions arranged alternately in cross section. The transverse length of the coolant passage forming member 43 in the drawing is the same as the length W1 from the inner side of the coolant supply through-hole 446a to the inner side of the coolant discharge through-hole 446b shown in FIG. 2B, and the vertical length is the same as the vertical length W2 of the coolant supply through-hole 446a and the coolant discharge through-hole 446b. The height of the coolant passage forming member 43 is approximately the same as the thickness t of the intermediate plate 45. In the manufacturing process of the separator 41, the coolant passage forming member 43 is placed in a region between the coolant supply through-hole 426a and the coolant discharge through-hole 426b of the cathode facing plate 42, and in a region between the coolant supply through-hole 446a and the coolant discharge through-hole 446b of the anode facing plate 44.

FIG. 3 is a plane view of the separator 41. The separator 41 is formed by placing the coolant passage forming member 43 at the center of the coolant flowing part 456 of the intermediate plate 45, and then bonding the cathode facing plate 42, the anode facing plate 44 and the intermediate plate 45 with an adhesive. Here, the separator 41 is shown as viewed from the anode facing plate 44 side.

As can be understood from the drawing, the air supply through-holes 442a, 452a, and 422a are formed in the same position through the anode facing plate 44, the intermediate plate 45, and the cathode facing plate 42. The air discharge through-holes 442b, 452b and 422b are formed in the same position. The hydrogen supply through-holes 444a, 454a, and 424a are formed in the same position. The hydrogen discharge through-holes 444b, 454b, and 424b are formed in the same position. These through-holes function as the first through-hole of the invention.

The hydrogen supply ports 444i and the through-holes 452e1 are formed in the same positions through the anode facing plate 44 and the intermediate plate 45. The hydrogen discharge ports 444o and the through-holes 452f1 are formed in the same positions. The air supply ports 422i and the through-holes 452c1 are formed in the same positions through the cathode facing plate 42 and the intermediate plate 45. The air discharge ports 422o and the through-holes 452d1 are formed in the same positions. These through-holes function as the second through-hole of the invention.

The coolant supply through-holes 446a and 426a are formed in the same position through the anode facing plate 44 and the cathode facing plate 42. The coolant discharge through-holes 446b and 426b are formed in the same position.

Figure 4A:
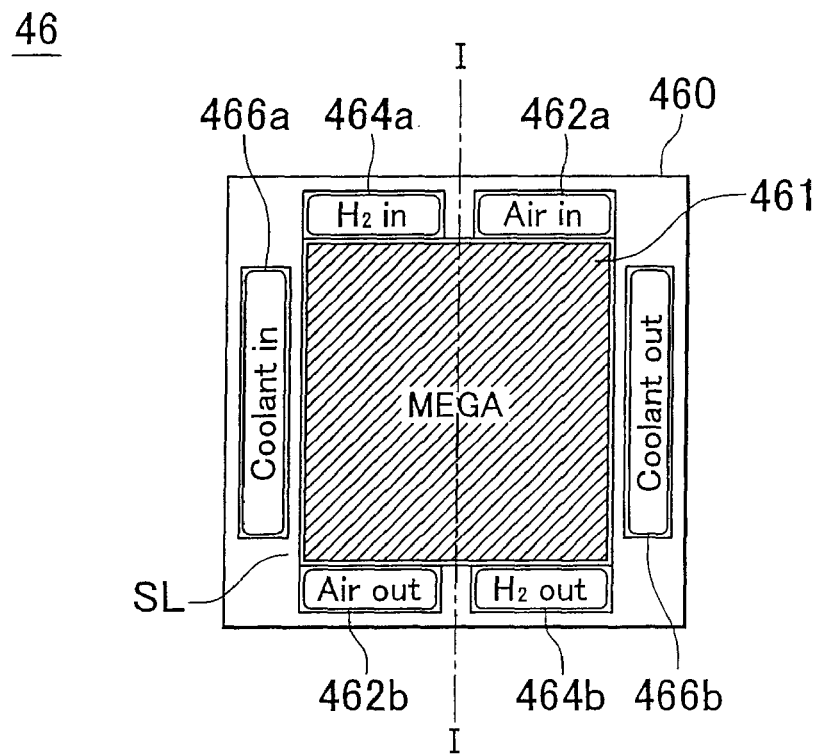
FIGS. 4A and 4B are explanatory views of a MEGA seal gasket 46.
Figure 4B:
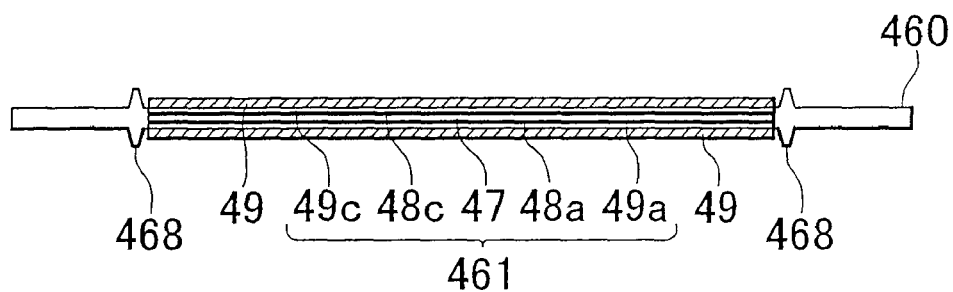

FIGS. 4A and 4B are explanatory views of the MEGA seal gasket 46. FIG. 4A is a plane view of the MEGA seal gasket 46 as viewed from the cathode side. FIG. 4B is a cross-sectional view taken along the line I-I of FIG. 4A.

As shown in the drawings, the MEGA seal gasket 46 has a MEGA section 461 and a frame 460 surrounding and supporting the MEGA section 461. Although silicone rubber is used for the frame 460 in this embodiment, the present invention is not limited thereto. Other materials having gas impermeability, elasticity, and heat resistance may also be used.

The MEGA section 461 is a membrane-electrode assembly in which a cathode diffusion layer 49c is stacked on a cathode catalyst layer 48c and over one surface (cathode side surface) of an electrolyte membrane 47 and an anode diffusion layer 49a is stacked an anode catalyst layer 48a over the other surface (anode side surface) of the electrolyte membrane 47 as shown in FIG. 4B. In this embodiment, carbon porous bodies are used as the anode diffusion layer 49a and the cathode diffusion layer 49c. Also, in this embodiment, metal porous layers 49, which function as gas passage layers for allowing hydrogen and air to flow when the MEGA seal gasket 46 is stacked on the separator 41, are provided on both sides of the MEGA section 461. With this constitution, the gasses may be supplied as diffused efficiently over the entire surfaces of the anode and the cathode. For the gas passage layers, other materials having electrical conductivity and gas diffusibility such as carbon may be used in place of the metal porous bodies.

The frame 460 has an air supply through-hole 462a, an air discharge through-hole 462b, a hydrogen supply through-hole 464a, a hydrogen discharge through-hole 464b, a coolant supply through-hole 466a, and a coolant discharge through-hole 466b as in the case with the separator 41 as shown in FIG. 4A. Sealing parts 468 are integrally provided around the through holes and around the MEGA section 461 to form seal lines SL shown by thin lines in FIG. 4A. That is, the frame 460 functions as a gasket that prevents leakage of hydrogen, oxygen and coolant. The frame 460 is formed by, for example, injection molding.

Figure 5A:
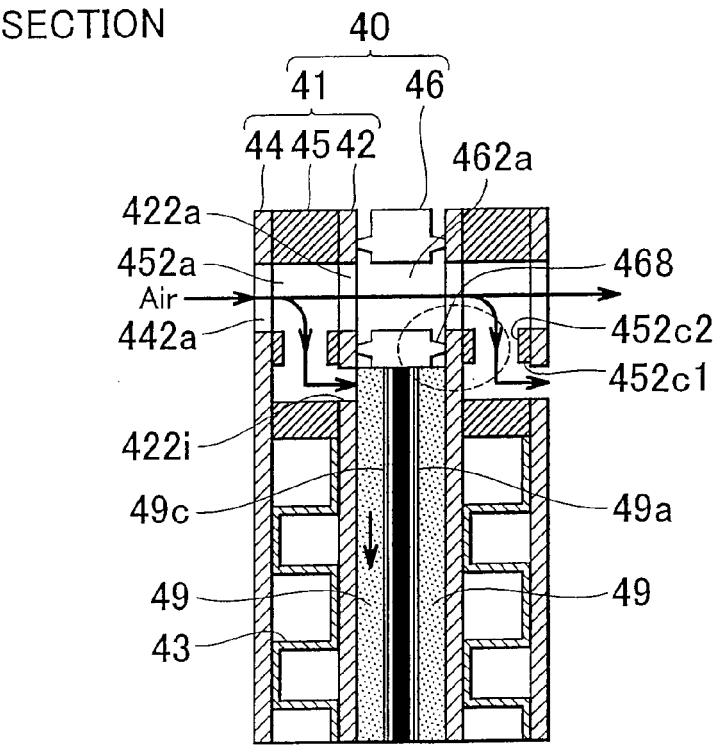
FIGS. 5A and 5B are explanatory views of the cross-sectional structure of a fuel cell module 40.
Figure 5B:
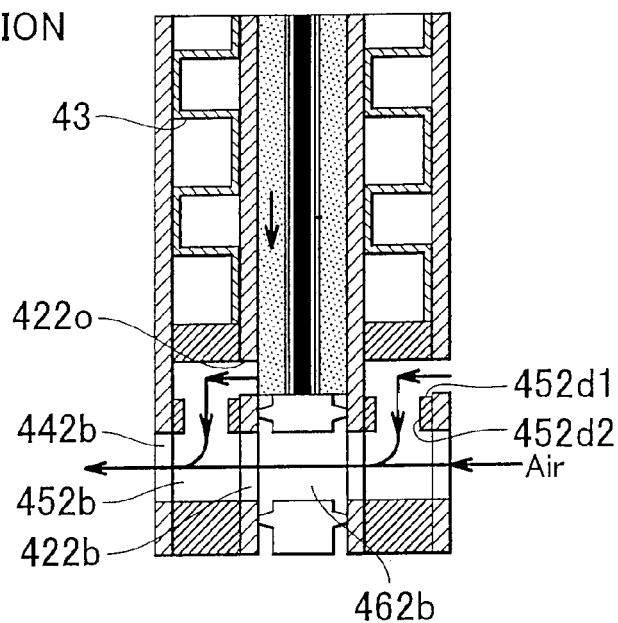
Figure 6A:
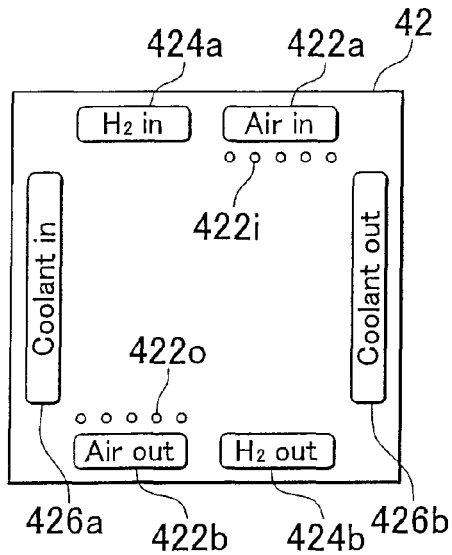
FIGS. 6A, 6B, 6C and 6D are plane views of components of a separator 41A as a comparative example.
Figure 6B:
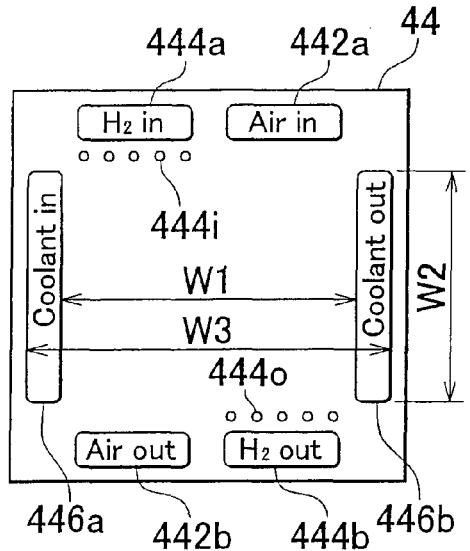
Figure 6C:
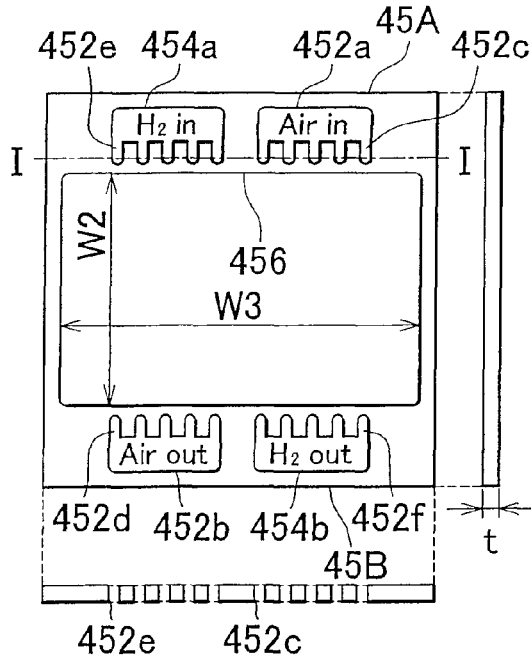
Figure 6D:
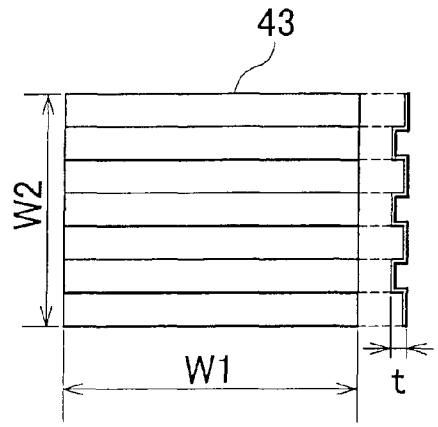

FIGS. 5A and 5B are explanatory views of the cross-sectional structure of the fuel cell module 40. FIG. 5A is a cross-sectional view taken along the line I-I of FIG. 3, and FIG. 5B is a cross-sectional view taken along the line II-II of FIG. 3.

In the MEGA seal gasket 46, the metal porous layer 49 on the anode side of the MEGA section 461 contacts the anode facing plate 44 of the separator 41 when the MEGA seal gasket 46 and the separator 41 are stacked together. Also, the metal porous layer 49 on the cathode side of the MEGA section 461 contacts the cathode facing plate 42 of the separator 41 when the MEGA seal gasket 46 and the separator 41 are stacked together. The sealing parts 468 contact the cathode facing plate 42 and the anode facing plate 44 to form the seal lines SL shown in FIG. 4A.

As shown by arrows in FIG. 5A, in the fuel cell module 40, air supplied from the air supply through-hole 442a of the anode facing plate 44 is branched in the air supply through-hole 452a of the intermediate plate 45, and passes through the communication passage 452c2 and the through-hole 452c1 to be supplied from the air supply port 422i of the cathode facing plate 42 vertically with respect to the surface of the MEGA section 461. The air then flows in the metal porous layer 49 on the cathode side and in the cathode diffusion layer 49c, and as shown in FIG. 5B, is discharged from the air discharge port 422o of the cathode facing plate 42 vertically with respect to the surface of the MEGA section 461, passes through the through-hole 452d1, the communication passage 452d2, and the air discharge through-hole 452b of the intermediate plate 45, and is discharged from the air discharge through-hole 442b of the anode facing plate 44.

Here, only the flow of the air to be supplied to the cathode of the MEGA section 461 has been described. The hydrogen to be supplied to the anode flows in the same way.

Next, the separator 41A and a fuel cell module 40A, as a comparative example, will be described to clarify the effect of the embodiment described above. The construction of the fuel cell stack in the comparative example is the same as that of the fuel cell stack 100 of the embodiment except for the separator 41A.

FIGS. 6A to 6D are plane views of components of the separator 41A as a comparative example. The separator 41A is constituted of components stacked together as in the case with the separator 41. The separator 41A is constituted of a cathode facing plate 42, an anode facing plate 44, an intermediate plate 45A, and a coolant passage forming member 43. The cathode facing plate 42, the anode facing plate 44, and the coolant passage forming member 43 are the same as those in the separator 41 in the embodiment described above. The intermediate plate 45A is partly different from the separator 41 in the embodiment described above. Thus, hereinafter, the cathode facing plate 42, the anode facing plate 44, and the coolant passage forming member 43 are not described, and only the intermediate plate 45A is described.

As shown in the drawing, the intermediate plate 45A has an air supply through-hole 452a, an air discharge through-hole 452b, a hydrogen supply through-hole 454a, and a hydrogen discharge through-hole 454b, as in the case with the intermediate plate 45 in the embodiment described above. The air supply through-hole 452a has a plurality of air supply passage forming portions 452c that allow air to flow from the air supply through-hole 452a to the plurality of air supply ports 422i of the cathode facing plate 42, respectively, in place of the through-holes 452c1 and the communication passages 452c2 in the embodiment described above. The air discharge through-hole 452b has a plurality of air discharge passage forming portions 452d that allow air to flow from the plurality of air discharge ports 422o of the cathode facing plate 42 to the air discharge through-hole 452b, in place of the through-holes 452d1 and the communication passages 452d2 in the embodiment described above. The hydrogen supply through-hole 454a has a plurality of hydrogen supply passage forming portions 452e that allow hydrogen to flow from the hydrogen supply through-hole 454a to the plurality of hydrogen supply ports 444i of the anode facing plate 44, respectively, in place of the through-holes 452e1 and the communication passages 452e2 in the embodiment described above. The hydrogen discharge through-hole 454b has a plurality of hydrogen discharge passage forming portions 452f that allow hydrogen to flow from the plurality of hydrogen discharge ports 444o of the anode facing plate 44 to the hydrogen discharge through-hole 454b, in place of the through-holes 452f1 and the communication passages 452f2 in the embodiment described above. The air supply passage forming portions 452c, the air discharge passage forming portions 452d, the hydrogen supply passage forming portions 452e, and the hydrogen discharge passage forming portions 452f pass through the intermediate plate 45A in the thickness direction.

Figure 7A:
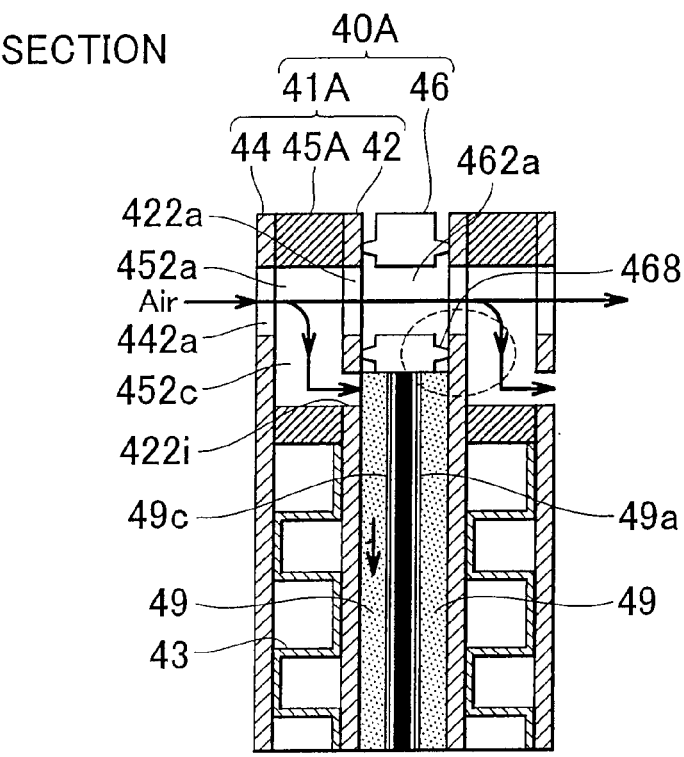
FIGS. 7A and 7B are explanatory views of the cross-sectional structure of a fuel cell module 40A as a comparative example.
Figure 7B:
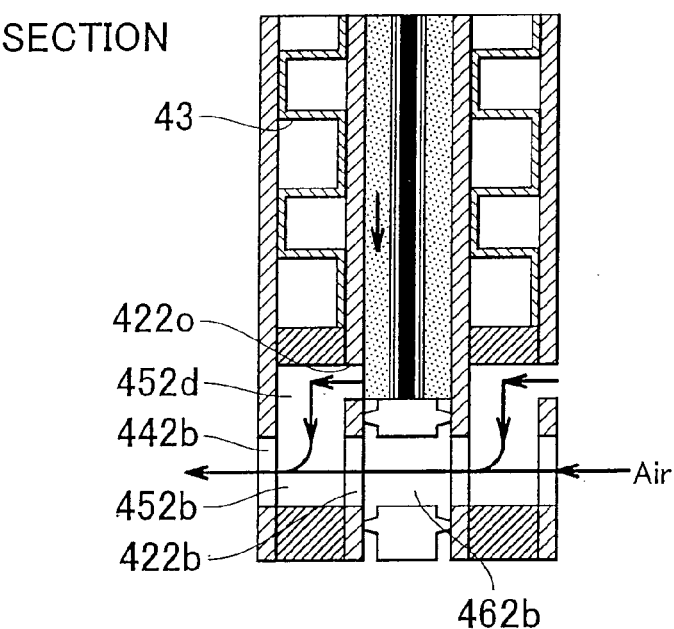

FIGS. 7A and 7B are explanatory views of the cross-sectional structure of the fuel cell module 40A as a comparative example. FIG. 7A corresponds to FIG. 5A that is a cross-sectional view taken along the line I-I of FIG. 3, and FIG. 7B corresponds to FIG. 5B that is a cross-sectional view taken along the line II-II of FIG. 3.

The MEGA seal gasket 46 is the same as that in the embodiment described above.

As shown by arrows in FIG. 7A, in the fuel cell module 40A, air supplied from the air supply through-hole 442a of the anode facing plate 44 is branched in the air supply through-hole 452a of the intermediate plate 45, and passes through the air supply passage forming portion 452c to be supplied from the air supply port 422i of the cathode facing plate 42 vertically with respect to the surface of the MEGA section 461. The air then flows in the metal porous layer 49 on the cathode side and in the cathode diffusion layer 49c, and as shown in FIG. 7B, is discharged from the air discharge port 422o of the cathode facing plate 42 vertically with respect to the surface of the MEGA section 461, passes through the air discharge passage forming portion 452d and the air discharge through-hole 452b of the intermediate plate 45, and is discharged from the air discharge through-hole 442b of the anode facing plate 44. Here, only the flow of the air to be supplied to the cathode of the MEGA section 461 has been described. The hydrogen to be supplied to the anode flows in the same way.

In the embodiment and the comparative example described above, the areas in the ellipse of the broken line in FIGS. 5A and 7A are specifically focused. The separator 41, or the separator 41A, and the MEGA seal gasket 46 are stacked together, and a predetermined load in the stacking direction is applied thereto. Then, in the embodiment described above, because the intermediate plate 45 is formed with the communication passages 452c2, the load applied to the separator 41 in the stacking direction by the sealing parts 468 is supported by the anode facing plate 44 and the intermediate plate 45, as shown in FIG. 5A. In contrast, in the comparative example, because the intermediate plate 45A is formed with the air supply passage forming portions 452c passing through the intermediate plate 45A in the thickness direction, the load applied to the separator 41A in the stacking direction by the sealing parts 468 of the MEGA seal gasket 46 is supported only by the anode facing plate 44 and not by the intermediate plate 45A, as shown in FIG. 7A. Thus, with the separator 41 of the embodiment described above, the rigidity against loads applied vertically to the surface of the separator is increased, compared to the separator 41A of the comparative example.

Figure 8:
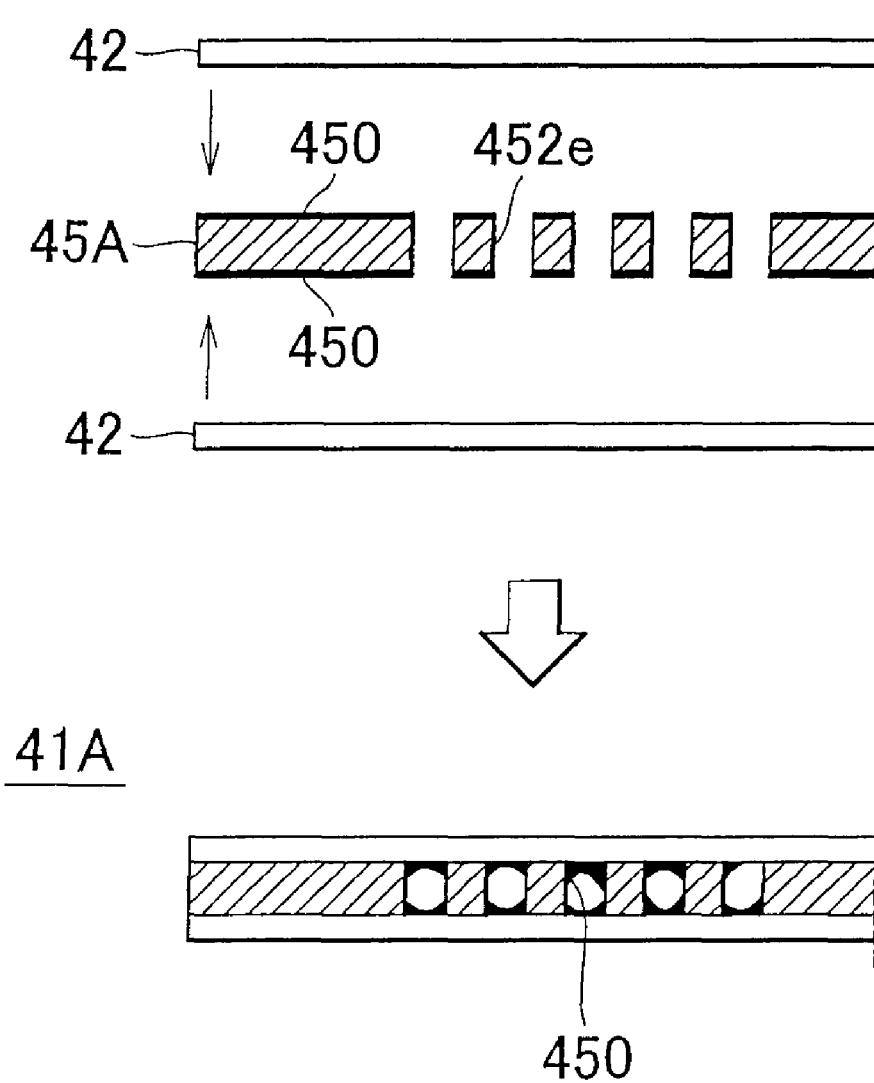
FIG. 8 is an explanatory view illustrating another effect of the embodiment.

FIG. 8 is an illustrates another effect of the embodiment described above. The upper part of FIG. 8 shows a cross-sectional view of a part of the cathode facing plate 42, the intermediate plate 45A, and the anode facing plate 44 in the comparative example. The lower part of FIG. 8 shows a cross-sectional view of the separator 41A formed by bonding together the cathode facing plate 42, the intermediate plate 45A, and the anode facing plate 44 using an adhesive 450.

When the adhesive 450 is applied to both surfaces of the intermediate plate 45A and the cathode facing plate 42 and the anode facing plate 44 are bonded to the intermediate plate, as shown in the upper part of FIG. 8, the adhesive 450 may be squeezed into the hydrogen supply passage forming portions 452e which pass the intermediate plate 45A in the thickness direction, as shown in the lower part of FIG. 8. This reduces the cross-sectional areas of the passages and a desired gas flow rate may not be achieved. In contrast, the intermediate plate 45 of the embodiment described above has communication passages 452e2 which do not pass through the intermediate plate 45 in the thickness direction, as can be understood from the cross-sectional view of the intermediate plate 45 shown in FIG. 2C and so forth. Thus, the adhesive 450 is not squeezed into the communication passages 452e2 when the cathode facing plate 42, the anode facing plate 44, and the intermediate plate 45 are bonded together using the adhesive 450. Thus, the cross-sectional areas of the communication passages 452e2 are not reduced by the adhesive 450 and a desired gas flow rate can be achieved.

Although an embodiment of the present invention has been described above, the present invention is not limited to the described embodiment, and various modifications may be made thereto without departing from the object thereof. For example, the following modifications can be made.

Although a resin member is used as the intermediate plate 45 and bonded to the cathode facing plate 42 and the anode facing plate 44 using the adhesive 450 in the embodiment described above, the present invention is not limited thereto. A metal member may be used as the intermediate plate 45, for example, and bonded to the cathode facing plate 42 and the anode facing plate 44 using a brazing material. However, using a resin intermediate plate 45 reduces the weight of the separator 41 and the fuel cell stack 100. Another advantage of a resin member is that it is easier to process, compared to a metal member.

Although the air supply through-hole 452a, the air discharge through-hole 452b, the hydrogen supply through-hole 454a, and the hydrogen discharge through-hole 454b of the intermediate plate 45 are provided with the through-holes 452c1, 452d1, 452e1, and 452f1, and the communication passages 452c2, 452d2, 452e2, and 452f2, respectively, in the embodiment described above, the present invention is not limited thereto. The various passage forming portions described above in the comparative example may be provided for a part of the air discharge through-hole 452b, the hydrogen supply through-hole 454a, and the hydrogen discharge through-hole 454b.

While the invention has been described with reference to example embodiments thereof, it is to be understood that the invention is not limited to the described embodiments or constructions. To the contrary, the invention is intended to cover various modifications and equivalent arrangements. In addition, while the various elements of the embodiments are shown in various combinations and configurations, other combinations and configurations, including more, less or only a single element, are also within the spirit and scope of the invention.

The invention claimed is:

1. A separator for use in a fuel cell that has a stack structure in which a plurality of membrane-electrode assemblies are stacked with the separators interposed therebetween, each membrane-electrode assembly having an electrolyte membrane and electrodes disposed on both sides thereof, the separator comprising:

two electrode facing plates that face the respective electrodes of the membrane-electrode assembly; and an intermediate plate interposed between the two electrode facing plates, wherein the two electrode facing plates and the intermediate plate each have:

a first through-hole through which a reaction gas that is supplied to the membrane-electrode assembly, or a discharge gas that is discharged from the membrane-electrode assembly, flows in a stacking direction of the stack structure, the first through-holes of the two electrode facing plates and the intermediate plate overlapping with each other as viewed in the stacking direction;

one of the two electrode facing plates, and the intermediate plate each have: a second through-hole through which at least the reaction gas is supplied, or the discharge gas is discharged, perpendicularly with respect to a surface of the membrane-electrode assembly, the second through-holes of the one of the two electrode facing plates and the intermediate plate overlapping with each other when viewed in the stacking direction;

the intermediate plate has a communication passage for communication between the first through-hole and the second through-hole in the intermediate plate; wherein said communication passage is a through-hole that passes through an inside of the intermediate plate in a direction perpendicular to the stacking direction of the stack structure, and wherein a dimension of the communication passage in a direction of a thickness of the intermediate plate is smaller than the thickness of the intermediate plate.

2. The separator according to claim 1, wherein the two electrode facing plates and the intermediate plate are bonded together using a bonding agent.

3. The separator according to claim 2, wherein the intermediate plate is made of resin, and the bonding agent is an adhesive.

4. The separator according to claim 2, wherein the intermediate plate is made of metal, and the bonding agent is a brazing material.

5. A fuel cell having a stack structure in which a plurality of membrane-electrode assemblies are stacked with separators interposed therebetween each membrane-electrode assembly having an electrolyte membrane and electrodes disposed on both sides thereof, wherein:

the separator is the separator according to claim 1.

* * * * *